United States Patent [19]

Griffith et al.

[11] 4,343,026

[45] Aug. 3, 1982

[54] MAGNETORESISTIVE HEAD EMPLOYING FIELD FEEDBACK

[75] Inventors: Neil J. Griffith, San Diego; Fredrick J. Jeffers, Escondido; Ward M. Calaway, Sierra Madre, all of Calif.

[73] Assignee: Spin Physics, Inc., San Diego, Calif.

[21] Appl. No.: 167,162

[22] Filed: Jul. 9, 1980

[51] Int. Cl.³ .......................... G11B 5/12; G11B 5/30
[52] U.S. Cl. .................................. 360/113; 338/32 R
[58] Field of Search ................. 360/113, 66, 123–124, 360/125; 338/32 R

[56] References Cited

U.S. PATENT DOCUMENTS 4,050,086 9/1977 Harr ................................... 360/113
4,280,158 7/1981 de Niet ............................... 360/113

OTHER PUBLICATIONS

IBM Tech. Disc. Bull., Nepela et al., Resistive Element for Bias and Noise Cancellation of Magnetoresistive Head, vol. 17, No. 9, Feb. 1975, pp. 2759–2760.
Nachrichten Elektronik (Germany), vol. 34, No. 1, Jan. 1980, p. 29.

*Primary Examiner*—Alfred H. Eddleman
*Attorney, Agent, or Firm*—Robert F. Cody

[57] ABSTRACT

An electrically conductive element is employed in proximity to a thin film magnetic structure. The conductive element has current applied to it which is just sufficient to maintain, by field coupling between the thin film structure and the conductive element, the given magnetic orientation of the thin film structure, this occurring despite the application of a signal field tending to reorient the magnetization of the thin film structure. Such current is, therefore, the analog of the applied signal field and, since the magnetization of the thin film structure, by virtue of induced magnetic feedback, does not appreciably change direction, harmonics of any signal field applied to the thin film structure, and noise, are not manifested in the current analog.

7 Claims, 7 Drawing Figures

MAGNETORESISTIVE HEAD EMPLOYING FIELD FEEDBACK

BACKGROUND OF THE INVENTION

1. Field of the Invention

This invention relates in general to thin film magnetoresistive reproduce heads of the type having oriented easy magnetization axes; and in particular to such heads, and apparatus cooperative therewith, and methods in which signal distortion and head noise are minimized and/or eliminated.

2. Description Relative to the Prior Art

Playback of recorded signals from a magnetic recording medium by means of a conventional magnetic head that is sensitive to flux rate-of-change is difficult for low recorded signal frequencies, and theoretically impossible for recorded DC signals, or when there is no relative speed between the recording medium and the magnetic head. Accordingly, various techniques have been proposed for sensing magnetic flux, as opposed to the rate-of-change of such flux, e.g. Hall effect, flux gate, and magnetoresistive devices, thereby to permit recording media to be used as optimally as possible.

With regard to the matter of magnetoresistive devices for sensing magnetic fields, the use of a thin film magnetoresistive structure for field sensing purposes is known. Representative prior art depicting the use of such magnetoresistive thin film structures can be found in the following references: U.S. Pat. Nos. 3,731,007; 3,947,889; 3,921,218; 3,945,038; and 4,051,542. Typically, a thin (planar) magnetoresistive film is employed to sense a magnetic field to which it is exposed by passing an electric sense current (either AC or DC) through the film, the film magnetization vector being canted with respect to both the direction of current flow and the direction of the field being sensed. The field being sensed exerts a torque on the magnetic moment in the film, causing the resistance of the film to increase or decrease depending on the sense and magnitude of the field applied to the film. The resistance of the film is, therefore, the analog of the field strength. Although such use of a magnetoresistive film represents a reasonably workable technique in the art of magnetic flux sensing, it suffers from, among other things, noise susceptibility and distortion:

As is known (Barkhausen) noise associated with a magnetic structure increases in direct proportion to the strength of any magnetic field applied to it, the magnetic domain walls within the structure abruptly migrating about in a noisy fashion as a function of the strength of such applied field. With regard to the matter of distortion, since the magnetization vector of a thin film magnetoresistive structure is canted (or cantable) with respect to both the direction of sense current flow and the direction of a field being sensed, variation in the magnetoresistance of the structure is inherently non-linear, i.e. it varies as a function of the cosine of the angle between the current direction and the magnetization vector, as well as a function of the cosine of the angle between the magnetization vector and the direction of the applied field being sensed. Such non-linearity undesirably gives rise to the generation of even harmonics of any alternating signal analog produced by the thin film structure. Also, when in response to large swings of an alternating magnetic field applied to the thin film magnetoresistive structure the structure periodically saturates (i.e. the cant of its magnetization axis remains fixed in orientation despite further increases in the strength of the field applied to it), odd harmonics of the corresponding signal analog are also undesirably produced. Harmonics, whether odd or even, appear as distortions of and within the signal analogs.

Although compensation for the non-linearity of the magnetoresistance-versus-field response characteristics of a thin film structure by precluding the production of even harmonics may be achieved relatively easily by use of paired oppositely-acting thin film structures in a bridge circuit as taught in U.S. application Ser. No. 057,619, now U.S. Pat. No. 4,306,215, such a technique inherently increases the production of noise and the generation of odd harmonics.

A paper has recently been presented (IEEE Transactions on Magnetics, Vol. MAG-15, No. 6, November 1979, "A Magnetoresistive Head With Magnetic Feedback," pages 1625-1627, by E. de Niet and R. Vreeken) disclosing a technique for precluding the generation of harmonics, and vastly reducing noise, in a thin magnetoresistive head. Such technique, as will be appreciated below, is (at least broadly) conceptually the same as that practiced by the invention.

SUMMARY OF THE INVENTION

In a thin film magnetoresistive structure having an easy magnetization axis that has a given orientation (or whose magnetization vector may be biased to a given orientation), and which structure exhibits a change in resistance when the direction of its magnetization vector changes, the concept of the invention is to provide an electrically conductive element in proximity to the thin film structure and to apply current to such conductive element which is just sufficient to maintain, by "field coupling" between the thin film structure and the conductive element, the given orientation of the magnetization vector despite the application thereto of a signal field tending to reorient the magnetization vector. Such current is, therefore, the analog of the applied signal field and, since the magnetization vector, by virtue of induced magnetic feedback, does not appreciably change direction, harmonics of any signal field applied to the thin film structure, and noise, are not manifested in the current analog.

The electrically conductive element, in preferred embodiments of the invention, is a thin electrically conductive film (or a plurality thereof) which is (or are) laminated to the thin film magnetoresistive structure (with suitable electrical insulation therebetween), thereby providing good field coupling between the magnetic and electrically conductive films. Various laminations are within the contemplation of the invention and, indeed, the structure of U.S. application Ser. No. 057,619, with its odd plurality of current-carrying laminations to preclude unwanted biasing of thin film magnetoresistive elements, is adaptable to the practice of the invention. For example, in such a structure, although sense current is adapted to flow serially through two magnetoresistive laminae which sandwich a third non-magnetic electrically conductive lamina, thereby to preclude unwanted biasing of the two magnetoresistive laminae, if (in accordance with the invention) a feedback-field-producing current is applied exclusively to the electrically conductive lamina, one of the two magnetoresistive laminae will, even in the presence of signal field, have the direction of its magnetization vector fixed by the feedback field. In contrast, the direction of magnetization of the other magnetoresistive lamina, in response to the applied signal field, will not only change, but such change will be augmented by the feedback field. The effect of feedback-field-producing current flow through the electrically conductive lamina works to prevent harmonic and noise generation in the magnetoresistive lamina with "fixed" magnetization; and because the electrically conductive lamina is proximate the other magnetoresistive lamina—of variously directed magnetization—that magnetoresistive lamina (despite its variously directed magnetization) serves to concentrate the feedback field produced by the electrically conductive lamina, and evenly distributes the feedback field to the magnetoresistive lamina with "fixed" magnetization. In this, as in other embodiments of the invention, the current which produces the feedback field constitutes the analog of the signal field applied to the thin film structure.

Although the invention is described below in connection with a variety of thin film magnetoresistive structures which themselves are disposed to cooperate directly with a recording medium, the invention may also be practiced with a thin film magnetoresistive structure that resides, say, at the back gap of a gapped core structure, as disclosed in the aforenoted paper, or as depicted in FIG. 6 of the aforenoted U.S. patent application Ser. No. 057,619. Such a practice, as will be discussed later, embraces the invention in its presently preferred form.

The invention will be now described further with reference to the figures, wherein FIG. 1 is a schematic diagram illustrating an embodiment of the invention in which a pair of feedback elements cooperate with a thin film magnetoresistive structure having a cantable easy magnetization axis;

Figure 4A:
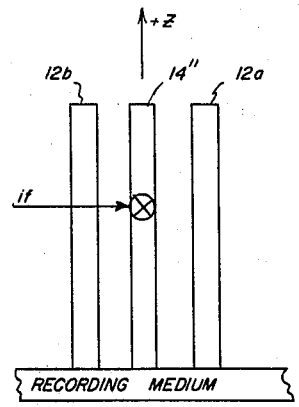
Figure 5:
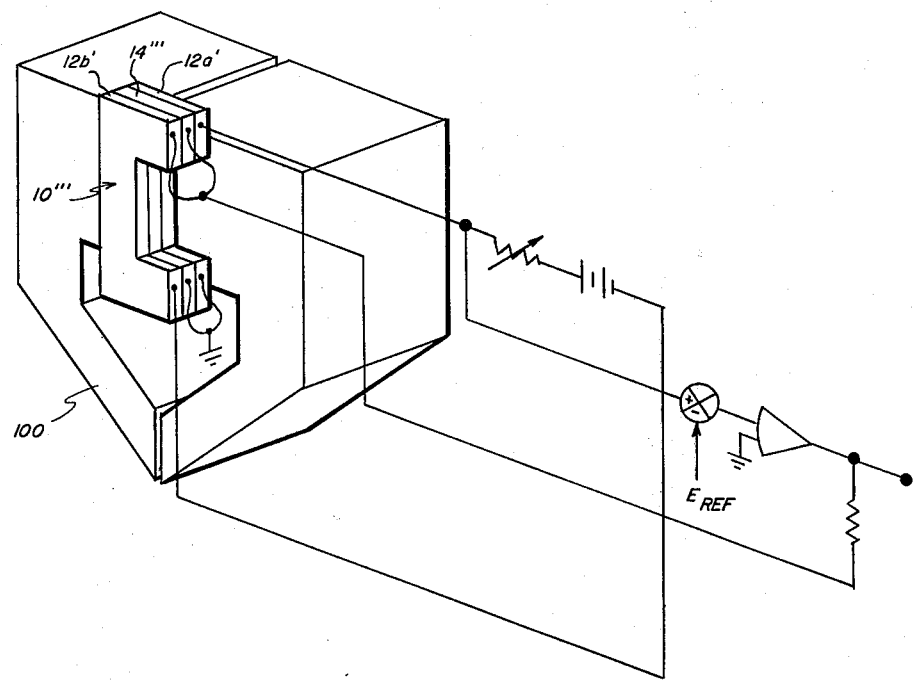

FIGS. 4a, b, c are diagrams useful in discussing fields associated with apparatus embodying the invention; and FIG. 5 is a schematic diagram of the presently preferred form of the invention.

Figure 1:
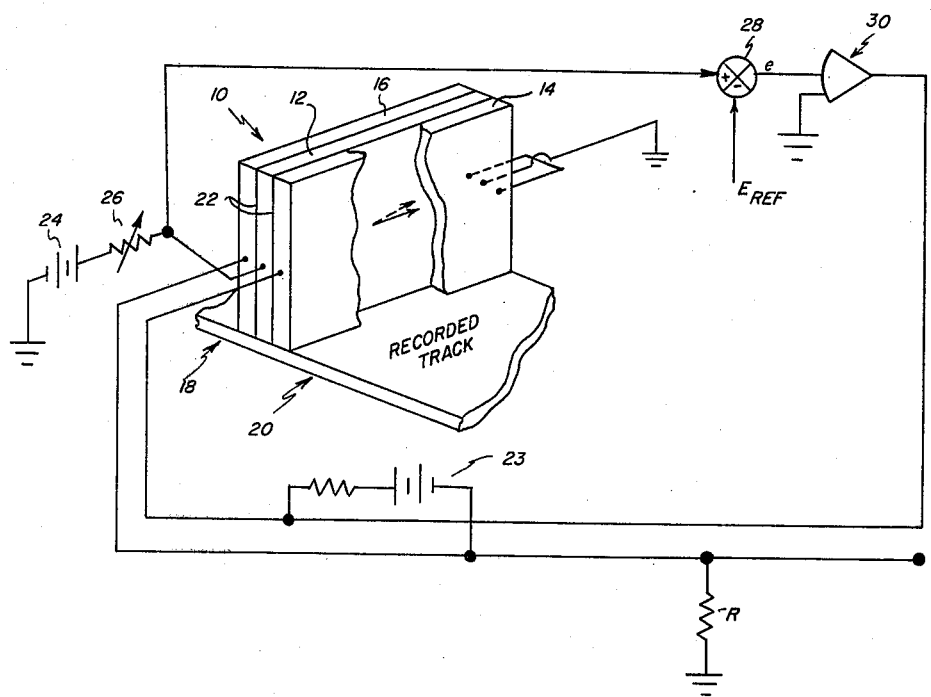

Referring to FIG. 1, a magnetoresistive structure 10 which is formed of a magnetic film 12 sandwiched between electrically conductive non-magnetic laminae 14, 16 is, in this embodiment of the invention, adapted to have its edge 18 contact a magnetic medium 20 to read magnetic flux patterns recorded in the medium. Electrical insulation 22 exists between the laminae; and sense current is adapted to be passed from a source 24, via a current control resistor 26, through the magnetic film 12. By means of bias current from a dc source 23, the easy magnetization axis of the magnetic film 12 is canted (as shown by the arrow on the film 12) with respect to the direction of sense current flow and, so, under quiescent conditions, the film has a certain resistance through which a quiescent current flows to develop a quiescent voltage. In response to any change in the strength of the signal field applied from the medium 20 to the film 12, the magnetization vector of the film 12 starts to change direction, thereby causing the voltage developed across the film 12 to start to change correspondingly.

A differencing circuit 28 receives both the voltage developed across the magnetic film 12 and a voltage $E_{REF}$ corresponding to the quiescent voltage, the error voltage output e of the differencing circuit 28 being employed to drive an operational amplifier 30, which is conventional: Since the input to the operational amplifier 30, by definition, draws no current, the voltage across its input will be zero so long as feedback current produced at the output of the amplifier causes the error voltage e to be cancelled. Noting that the feedback current passes through a resistor R, it will be appreciated that a voltage corresponding to the magnitude of the feedback current is developed across the resistor R; and such voltage corresponds to the strength of the field applied from the medium 20 to the film 12. That this is so will be appreciated from the fact that the feedback current which passes through the resistor R also passes, serially, through the electrically conductive laminae 14, 16, thereby generating a pair of magnetic feedback fields which similarly urge the magnetization vector of the film 12 to its quiescent orientation; and, in so doing, they completely buck the signal field applied to the magnetic film 12 by the medium 20. Since the magnetization vector of the film 12 is held fixed in orientation by the feedback fields, the dynamic range of the film 12 to respond to applied fields is not influenced by the saturability of the film. And, because the magnetic film 12 can never saturate when practicing the invention, odd harmonics of signals which it processes are avoided. Further, since the magnetic film 12 always sees an essentially constant net field, it therefore inherently responds to applied signal fields in a very linear way . . . which means that even harmonics of processed signals are avoided also.

With respect to the matter of Barkhausen noise, it will be appreciated that the level of noise associated with the apparatus of FIG. 1 is virtually uninfluenced by signal fields since the magnetization vector of the film 12 is kept essentially invariant: That is, as far as the film 12 is concerned, the noise producing resultant field which it sees is, in essence, always zero.

Figure 2:
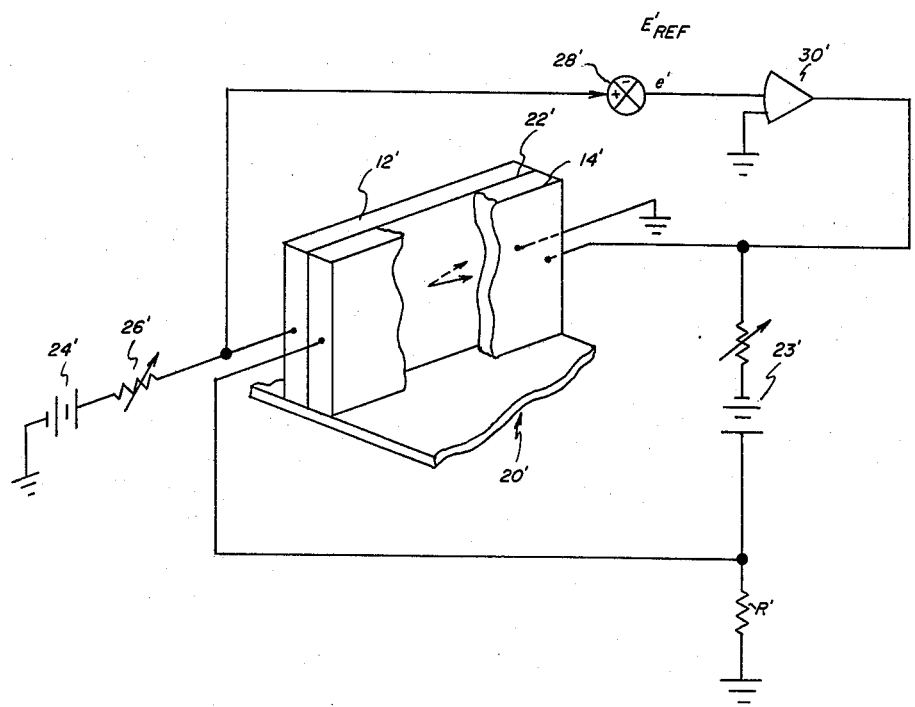
FIG. 2 is a schematic diagram illustrating another embodiment of the invention in which a thin film magnetoresistive structure has a cantable easy magnetization axis.

The apparatus of FIG. 2 is somewhat like the apparatus of FIG. 1, but rather than employ a pair of current carrying laminae for producing a pair of feedback fields, as in the FIG. 1 apparatus, the invention in this embodiment utilizes just one current carrying lamina 14' for producing a feedback field. (Except for the use of primes, corresponding parts of all figures hereof have the same character notations.) Sense current is passed from a source 24' via a current limiting resistor 26' through a magnetoresistive film 12'; and any voltage appearing across the film 12' is applied to a differencing circuit 28'. Given that the voltage across the film 12' has a quiescent level corresponding to a reference voltage $E'_{REF}$ when the bias current from a source 23' alone courses the lamina 14', the output error voltage e' of the differencing circuit is zero in the absence of any signal field applied to the magnetoresistive film 12' by a recording medium 20'. Should a signal field be applied to the magnetoresistive film 12' by the recording medium 20', tending to reorient the magnetization of the film 12', the resistance of the film 12' will start to change, causing the voltage across the film to start to change also. As an error voltage e' begins appearing at the output of the differencing circuit 28', an operational amplifier 30', as was the case in FIG. 1, causes a feedback current to flow, via the lamina 14' and resistor R' to ground, thereby producing a magnetic feedback field that maintains the quiescent orientation of the magnetization of the film 12'. As in the apparatus of FIG. 1, an output signal voltage corresponding to the signal field applied to the magnetoresistive film 12' by the medium 20' is taken across the resistor R'.

Figure 3:
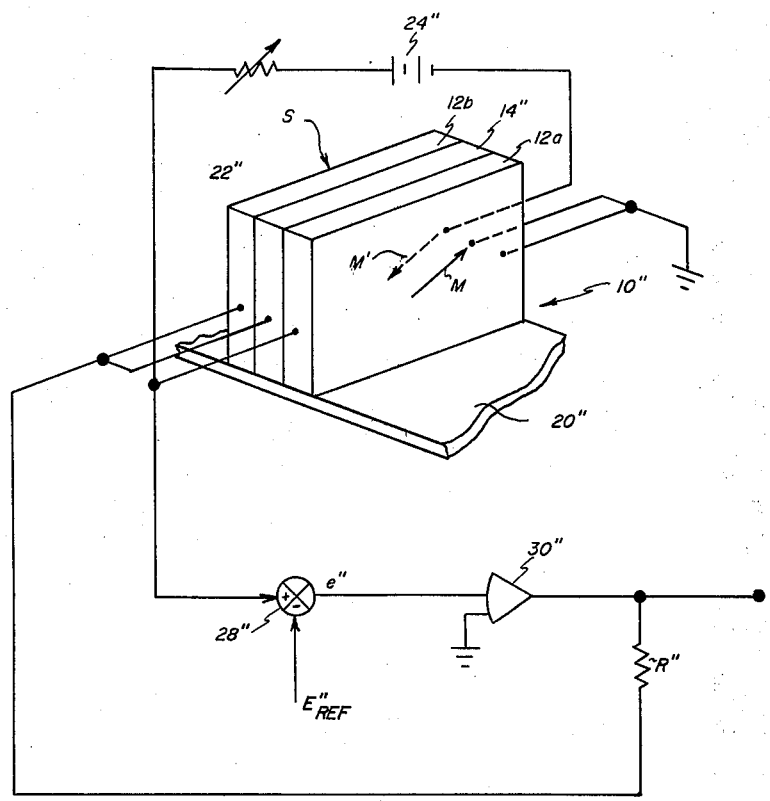
FIG. 3 is a schematic diagram illustrating the practice of the invention in connection with a magnetoresistive structure as indicated in copending U.S. application Ser. No. 057,619.

Turning now to FIG. 3, the invention is depicted as employing a magnetoresistive structure 10" (again, parts corresponding to components of FIG. 1 have similar—but, this time, double primed—character notations) comprising a pair of thin magnetic films 12a, 12b which sandwich, and are electrically insulated (22") from, an electrically conductive film 14". As taught in copending application Ser. No. 057,619, the magnetic vectors associated with the films 12a, 12b are oppositely oriented; and, although only one such film is employed in this embodiment as a voltage-developing magnetoresistive sensor, sense current from a source 24" is applied serially to the film 12a, then to the film 14", then to the film 12b, and then back to the source. Because the sense current in each pair of contiguous films, in such an odd plurality of films, flows in opposite spacial directions, such current creates virtually no magnetic bias on the remaining film of the sandwich. Given that the magnetic film 12a is disposed to develop a voltage thereacross in proportion to the resultant field which it sees, such voltage is compared (28") with a reference voltage, $E''_{REF}$, the error (e") therebetween serving to cause an operational amplifier 30" to pass, via a resistor R", a current through the electrically conductive film 14" (but not through the magnetic films 12a or 12b) of the sandwich of films. It is this passage of current exclusively through the electrically conductive film 14" which causes "enhanced" influence on the reorientation of magnetization of the film 12a by a magnetic feedback field: Consider, for example, that the magnetic vector M of the film 12a, as well as the magnetic vector M' of the film 12b, start to reorient toward the edge S of the sandwich of films in response to a signal field from a medium 20". This causes an error voltage to appear at the output of the circuit 28", which in turn causes the operational amplifier 30" to pass a feedback current through the electrically conductive film 14". The feedback current generates a magnetic feedback field which does two things: (1) the feedback field tends to reorient the magnetization vector M of the film 12a back to its quiescent orientation and (2) the feedback field further orients the magnetization vector M' of the magnetic film 12b away from its quiescent orientation . . . and it is this latter effect which not only distributes the feedback field along the length of the film 12a but also augments the feedback field itself by exerting a torque of the proper sense on the magnetization vector M. Thus, the response of the FIG. 3 apparatus is maximized.

Before addressing the invention in its presently preferred form, it is interesting to note the difference in effect that occurs when practicing the invention with a thin film structure which directly cooperates with, and contacts, a recording medium vs. the practice of the invention when the thin film structure resides at the back gap of a gapped core structure: A thin film structure which directly contacts the recording medium as in FIGS. 1–3 sees a spacially exponentially decaying signal field (and which field decay rate is, incidentally, wavelength dependent); by contrast, the field within and across the conventional back gap of a gapped core is essentially uniform. What this means in terms of the resultant field seen by a sensor—say for example the preferred 3-lamina structure which has an electrically conductive lamina sandwiched by magnetic laminae—may be appreciated from the qualitative diagrams of FIGS. 4a, b, c.

Figure 4B:
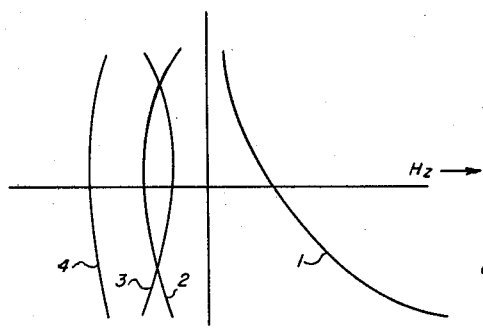
Figure 4C:
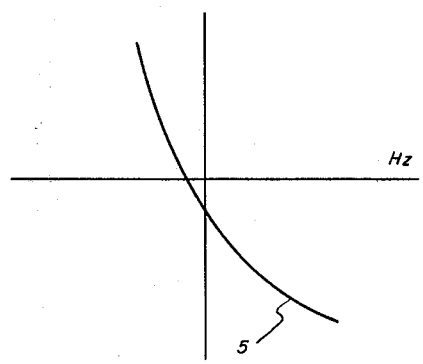

In FIG. 4a the three aforenoted laminae 12b, 14", and 12a, are shown, lamina 12a being the "sensor layer." The various fields seen by lamina 12a are shown in FIGS. 4b and 4c. Field 1 is the exponentially decaying signal field, chosen to be positive, which causes the direction of the magnetization vector of lamina 12a to change. This, in turn, causes the lamina 12a resistance to change, giving rise, through attendant electronics, to a feedback current $i_f$ in the lamina 14". This current creates a field 2 in the lamina 12a, which is larger at the center of the lamina 12a than at its edges. The current $i_f$ also gives rise to an equal (but opposite) field in the lamina 12b whose moment rotates in response to such field. This moment rotation, in turn, gives rise to the field 3 in lamina 12a which is larger at the edges of lamina 12a than at the center thereof. Thus, the total feedback field 4 seen by the lamina 12a is the sum of fields 2 and 3; and because of compensating non-uniformities the total feedback field 4 is more or less uniform. The net field applied to the lamina 12a is, therefore, the sum of the total feedback field 4 and the signal field 1, such net field being shown as field 5 in FIG. 4c. Although the net field, in the embodiment of FIG. 4a, averages to zero, it is extremely non-uniform because of the exponential variation of the signal field. This non-uniformity is undesirable because Barkhausen noise and harmonic distortion are only somewhat reduced rather than virtually eliminated as they would be if the signal field were uniform.

By placing a 3-lamina sensor of the type discussed in connection with FIG. 4a across the back gap of a core structure as shown in FIG. 5, the desired substantially uniformly distributed signal field is obtained. This uniform signal field, combined with the essentially uniform feedback field made possible by virtue of the 3-layer design, results in essentially perfect cancellation between the signal and feedback fields, yielding virtually no Barkhausen noise or harmonic distortion.

Referring, therefore, to FIG. 5, the invention in its presently preferred form employs a core structure 100 for applying a uniform signal field to a magnetoresistive signal sensing structure 10'''. The structure 10''', like the structure 10" of FIG. 3, has an electrically conductive lamina 14''' sandwiched by a pair of magnetic laminae 12a', 12b'. Although the electrical hookup to the signal-sensing structure in FIG. 5 is identical to that of FIG. 3, the uniformity of the signal field produced by the apparatus of FIG. 5 results in improved performance from the standpoints of noise and distortion.

The invention has been described in detail with particular reference to preferred embodiments thereof, but it will be understood that variations and modifications can be effected within the spirit and scope of the invention.

What is claimed is:

1. Magnetoresistive apparatus for producing an electrical signal that is the analog of a magnetically recorded signal comprising
    (a) magnetoresistive lamina means cooperative with said magnetically recorded signal,
    (b) electrically conductive lamina means proximate said magnetoresistive lamina means and so disposed with respect thereto that a field about said electrically conductive lamina means bucks the field associated with said magnetically recorded signal, (c) means cooperative with said magnetoresistive lamina means for producing and applying a current to said electrically conductive lamina means which is in proportion to the field applied to said magnetoresistive lamina means by said magnetically recorded signal, thereby to cause said magnetoresistive lamina means to see virtually no resultant field, and (d) means adapted to receive the current applied to said electrically conductive lamina means for developing a signal voltage corresponding to said current, said signal voltage being the analog of said magnetically recorded signal, whereby since virtually no resultant field is applied to said magnetoresistive lamina means (1) the dynamic range of said apparatus is optimal and (2) noise and signal distortion of said signal voltage are minimal, said magnetoresistive lamina means being a thin magnetic film, and said apparatus including (1) means for passing sense current through and in the plane of said film, and (2) means for biasing the easy axis of the film to an angle that is acute with respect to the direction of current flow through the film.

2. The apparatus of claim 1 wherein said electrically conductive lamina means is a pair of electrical conductors which sandwich said thin magnetic film, and wherein said conductors are so connected electrically that current applied thereto flows respectively in opposite spacial directions.

3. The apparatus of claim 1
(a) wherein said magnetic lamina means is a first thin magnetic film having a magnetization in a first direction,
(b) wherein said apparatus further includes
  (1) a second thin magnetic film having a magnetization the direction of which is substantially opposite to the magnetization of said first thin magnetic film, said second thin magnetic film being so disposed with respect to the first thin magnetic film that the two films sandwich said electrically conductive lamina means therebetween,
  (2) means for passing sense current through said one thin magnetic film, thence through said electrically conductive lamina means, and thence through the other thin magnetic film, and
(c) wherein said means for producing and applying a current through said conductive lamina means is adapted to pass said current through said conductive lamina means without said current passing through either of said thin magnetic films.

4. The apparatus of claim 3 (a) including a gapped magnetic core adapted to receive the field associated with said magnetically recorded signal, and (b) wherein said magnetoresistive apparatus is so disposed with respect to said core that flux entering the gap of said core is applied to said first thin magnetic film and uniformly distributed across the plane of said film.

5. Apparatus for detecting a magnetically recorded signal, said apparatus comprising
(a) a thin magnetic film structure adapted to receive the magnetic field associated with said signal,
(b) electrically conductive means spacially parallel to and proximate said thin magnetic film structure,
(c) means for applying a sense current to said thin magnetic film structure,
(d) means cooperative with said thin magnetic film structure for producing an error voltage corresponding to the difference between the voltage across said thin magnetic film structure and a reference voltage,
(e) means adapted to receive said error voltage for producing and applying current to said electrically conductive means in proportion to said error voltage, whereby the field associated with the current applied to said electrically conductive means bucks the field associated with said magnetically recorded signal, and
(f) means for producing a voltage corresponding to said applied current, said voltage being the electrical analog of said magnetically recorded signal.

6. The apparatus of claim 5 wherein
(a) said apparatus further includes a second thin magnetic film structure the magnetization of which is substantially opposite to the magnetization of said other thin magnetic film structure, and
(b) said electrically conductive means is a lamina structure sandwiched between said thin magnetic film structures, said lamina structure being so electrically connected in series with said thin magnetic film structures that the sense current applied to said other thin magnetic film structure flows successively through that structure, thence through said electrically conductive lamina structure, and thence through said second thin magnetic film structure.

7. The apparatus of claim 6
(a) wherein said apparatus further includes a magnetic core having front and rear gaps therein, said front gap being adapted to receive flux from the field associated with said magnetically recorded signal, and
(b) wherein said other thin magnetic film structure is situated in proximity to said rear gap, thereby to receive the field associated with said magnetically recorded signal substantially uniformly across the plane of said other thin film structure.

* * * * *